June 26, 1962
R. P. LAMPRECHT
3,040,830
HEIGHT ADJUSTING MECHANISM FOR SELF-PROPELLED
WHEEL SUPPORTED TOOL
Filed Jan. 4, 1960
2 Sheets-Sheet 1
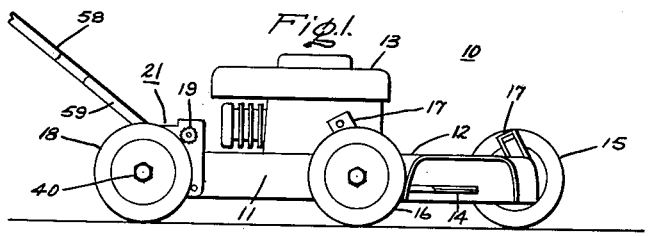
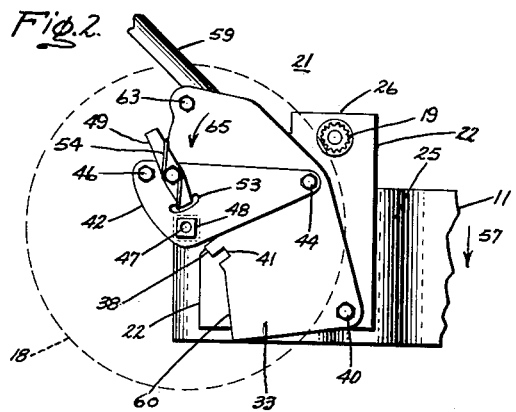
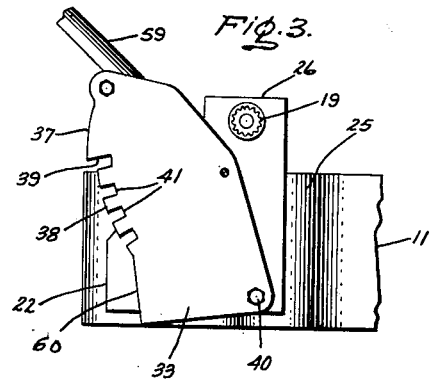
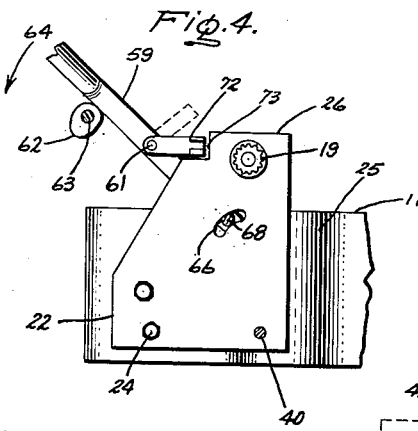
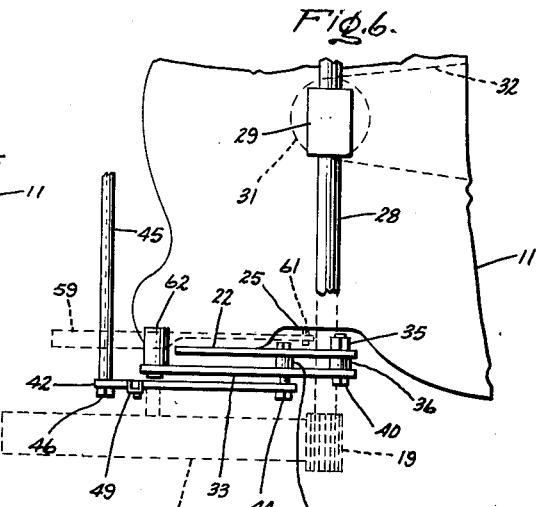
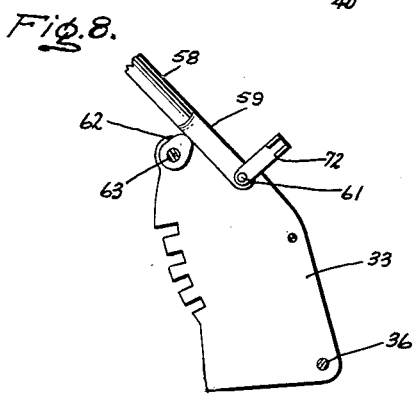
Inventor:
Richard P. Lamprecht,
by Just & Dish
Attorneys.

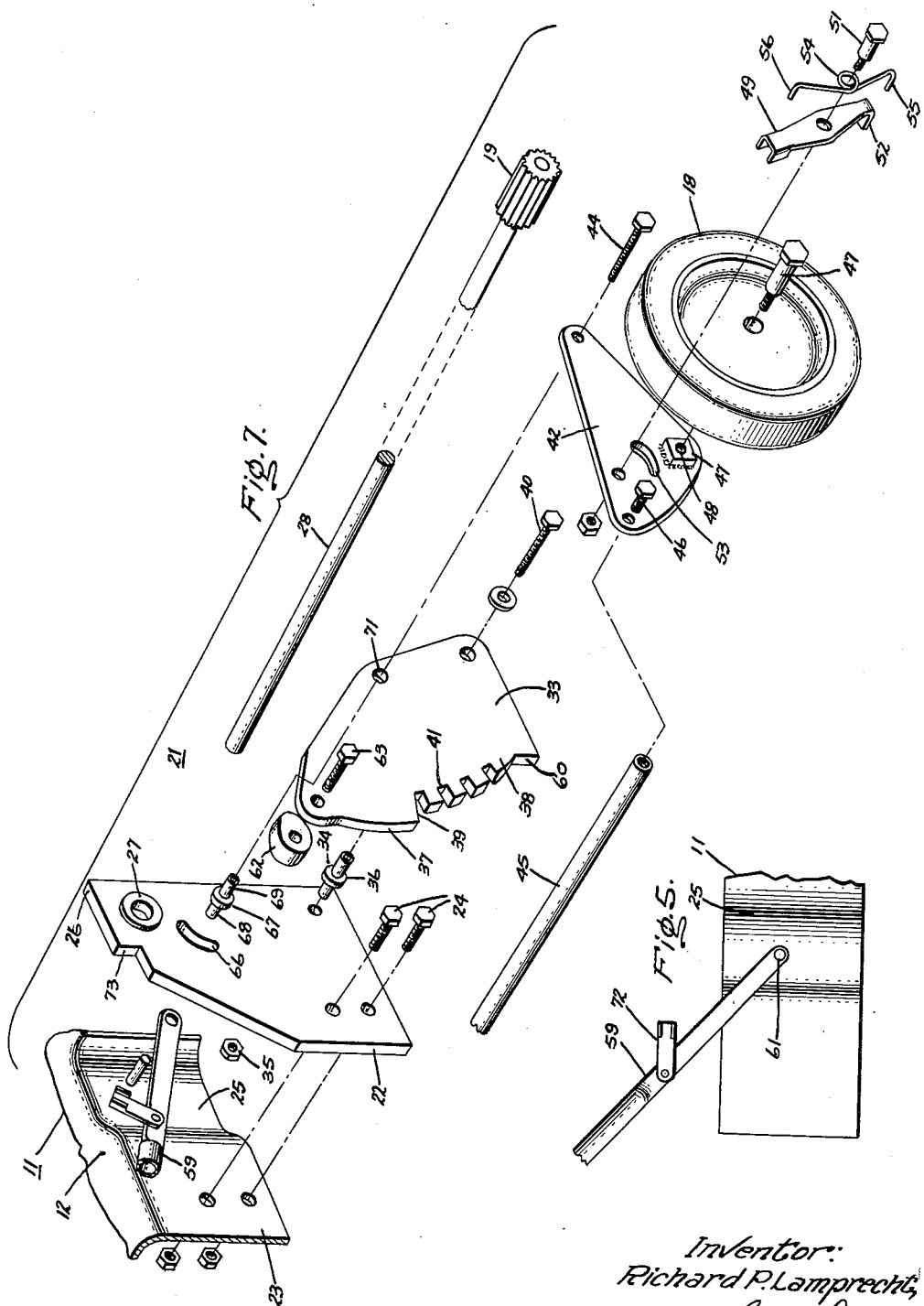

United States Patent Office 3,040,830
Patented June 26, 1962

3,040,830
HEIGHT ADJUSTING MECHANISM FOR SELF-PROPELLED WHEEL SUPPORTED TOOL
Richard P. Lamprecht, Fort Wayne, Ind., assignor to Wayne Home Equipment Company, Inc., Fort Wayne, Ind.
Filed Jan. 4, 1960, Ser. No. 245
2 Claims. (Cl. 180—19)

This invention relates generally to wheel-supported tools, such as rotary lawn mowers, and more particularly to a wheel driving and tool height-adjusting mechanism for tools of the self-propelled type.

Wheel supported lawn and garden type tools, as typified by the rotary lawn mower, have generally been propelled by hand, however, it is now considered generally desirable to provide a self-propelled rotary mower, and numerous mechanisms for effecting such self-propulsion have been proposed, such as that shown in Patent #2,896,731 to Stanley C. Siwek. In the particular case of lawn mowers, and also other lawn and garden type tools, it is desirable to provide a selective adjustment of the height of the tool above the ground. In the case of rotary lawn mowers, to the best of the present applicant's knowledge such height adjustment has in the past been accomplished by the simple expedient of providing a plurality of vertically spaced holes in the frame with the wheels of the tool being supported by a stud attached to the desired hole. Thus, in order to change the height of the tool, it is necessary for the operator to procure suitable hand tools, such as a wrench, and then manually to remove the nuts securing the respective wheel attaching studs in their respective holes, remove the studs and reinsert them in the desired holes, and finally to refasten the securing nuts on the studs, this procedure being time consuming and at times difficult. It is therefore desirable to provide a simple mechanism for adjusting the height of such a tool which will eliminate the aforementioned necessity for disconnecting and reconnecting wheel attaching studs. It is further highly desirable in the case of the rear wheels of a self-propelled tool, in the interests of economy and simplicity, to provide a simple mechanism for not only driving the rear wheels from the prime mover of the tool but also for selectively adjusting the height.

It is accordingly an object of my invention to provide an improved wheel driving and tool height adjusting mechanism for self-propelled wheel supported tools.

Another object of my invention is to provide an improved height adjusting mechanism for wheel supported tools.

A further object of my invention is to provide an improved wheel driving and tool height adjusting mechanism for self-propelled wheel supported tools in which the weight of the prime mover and frame of the tool provides the sole force causing engagement of the driving wheels with the driving elements.

Further objects and advantages of my invention will become apparent by reference to the following description and the accompanying drawing, and the features of novelty which characterize my invention will be pointed out with particularity in the claims annexed to and forming a part of this specification.

In accordance with the preferred embodiment of my invention, I provide first plate members located on each side of the frame of the tool and pivotally connected thereto and second plate members pivotally connected to each of the first plate members at points spaced from their pivotal axes. Supporting wheels for the tool are rotatably connected to each of the second plate members at points spaced from their pivotal axes. A power shaft is rotatably supported on the frame of the tool and has drive elements thereon positioned for engagement respectively with the wheels responsive to downward movement of the frame relative to the wheels and means are provided operatively connecting the power shaft to the prime mover of the tool. Means are provided for selectively latching each of the second plate members in a plurality of fixed positions with respect to its associated first plate member thereby to determine the height of the tool and handle means are provided interconnected with the first plate members for controlling pivotal movement thereof, thereby to move the wheels toward and away from the driving elements.

In the drawing, FIG. 1 is a side view of a self-propelled rotary lawn mower incorporating my invention;
FIG. 2 is a fragmentary side view of the improved rear wheel driving and tool height adjusting mechanism of my invention;
FIG. 3 is a fragmentary side view of the mechanism of FIG. 2 with certain parts removed;
FIG. 4 is a fragmentary side view of the mechanism of FIGS. 2 and 3 with additional parts removed;
FIG. 5 is a fragmentary side view showing the attachment of the handle to the mower frame;
FIG. 6 is a fragmentary top view of the mechanism of my invention with certain parts being shown in dashed lines for greater clarity;
FIG. 7 is a fragmentary exploded view further illustrating the preferred embodiment of my invention; and
FIG. 8 is a fragmentary side view illustrating a slightly modified form of my invention.

Referring now to FIG. 1, there is shown a rotary lawn mower, generally identified at 10, having a frame 11 with a generally horizontal deck portion 12 which supports prime mover 13, shown here as being an internal combustion engine. Engine 13 has a downwardly extending shaft (not shown) to which blade 14 is secured. The forward end of frame 11 is supported by front wheels 15 and 16, wheels 15 and 16 being adjustably secured to the opposite sides of the frame 11 by means of height-adjusting devices 17; height adjusting devices 17 for front wheels 14 and 16 are not a part of my invention, being a commercially available product. Rear wheels 18 support the rear end of frame 11 and also serve to propel mower 10 in a forward direction, being driven by drive pinions 19 which have an operative connection with the engine 13, as will be hereinafter more fully described. In order to provide for selectively engaging and disengaging the driving connection between rear wheels 18 and drive pinions 19, and also to provide selective adjustment of the height of the rear wheels 18, rear wheels 18 are attached to frame 11 by means of driving and height adjusting mechanisms 21 now to be more fully described.

Turning now to FIGS. 2 through 7 of the drawing, in which like elements are indicated by like reference numerals, rear wheel driving and height adjusting mechanism 21 comprises a pair of transversely spaced apart vertically upstanding bearing plates 22 respectively secured to opposite sides 23 of frame 11 in any suitable manner, as by threaded fasteners 24. As seen in FIG. 1, bearing plates 22 are secured to frame 11 rearwardly of the engine 13. In the specific example of my invention now being described, the opposite sides 23 of frame 11 have recessed portions 25 formed therein for a purpose shortly to be described. Bearing plates 22 have portions 26 extending above deck 12 of frame 11 and having suitable bearings 27 secured therein. A transverse drive shaft 28 is rotatably journaled in bearings 27 and has drive pinions 19 respectively secured on its ends, as shown. Drive shaft 28 is operatively connected to engine 13 in any suitable manner, as by a suitable gear box 29 having an input shaft 31 driven from the shaft of engine 13 by a belt 32, as best seen in FIG. 6; the driving connection between engine 13 and drive shaft 19 does not form a part of my invention and may take the specific form shown in Patent #2,896,731 to Stanley Z. Siwek.

A first pair of transversely spaced apart parallel pivoted plate members 33 are provided pivotally connected to bearing plates 22 as by suitable shoulder studs 34; it will be seen that recesses 25 in side 23 of frame 11 accommodate nuts 35 which threadingly engage pivot studs 34. It will be seen by reference particularly to FIGS. 2 through 4 that the pivot point of pivoted plate members 33 is spaced below the axis of the drive shaft 28, and it will further be seen that the pivoted plate member 33 extend upwardly and rearwardly from pivot studs 34. Reference to FIGS. 6 and 7 will clearly reveal that the shoulder 36 on shoulder bolt 34 is positioned between pivoted plate members 33 and bearing plates 22 and thus provides the requisite spacing therebetween. The rear edges of the first pivoted plate members 33 are formed as two arcuate segments 37 and 38 joined by a shoulder 39 and a plurality of notches 41 are formed in the lower arcuate segment 38, as shown.

A second pair of pivoted plate members 42 are provided pivotally connected to the first pivoted plate members 33 by pivot studs 44. Inspection of FIG. 2 will reveal that the second pivoted plate members 42 are pivotally connected to the first pivoted plate members 33 by pivot studs 44 at points spaced upwardly and rearwardly from the pivotal axis of the plate members 33 and that the plate members 42 extend generally rearwardly from their pivotal axes to points rearwardly of the pivoted plate members 33. The rear extremities of the second pivoted plate members 42 are secured together by a transverse tie rod 45 which is spaced from the rear end of the frame 11, as best seen in FIG. 6, tie rod 45 being connected to the second pivoted plate members 42 in any suitable manner, as by threaded fasteners 46. Rear wheels 18 are rotatably connected to second pivoted plate members 42, as by threaded engagement of wheel studs 47 with suitable nuts 48 welded to the second pivoted plate members 42 at points spaced rearwardly from pivot studs 44.

In order to provide for adjustment of the height of wheels 18, I provide latching lever members 49 pivotally connected to the second pivoted plate members 42 by pivot studs 51. The lever members 49 respectively have inturned portions 52 which extend through arcuate slots 53 in the plate members 42 and selectively engage notches 41 in the first pivoted plate members 33. In order to bias levers 49 so that their projecting portions 52 normally engage notches 41, I provide suitable coil springs 54 wrapped around studs 51 each having its two ends 55 and 56 respectively seated in the slot 53 and engaging the end of lever 49 remote from projecting portion 52. It will now be readily apparent that latching lever members 49 may be manually actuated against the bias exerted by springs 54 to pivot projecting portions 52 out of the particular notches 41 in which they have been seated, whereupon pivoted plate members 42 which carry the rear wheels 18 may be pivoted downwardly or upwardly as the case may be and projecting portions 52 of the lever members 49 then seated in a different notch 41. It will be observed that the shoulders 39 on the first pivot plate members 33 provide as a fixed stop for limiting the upward adjustment of wheels 18 since shoulders 39 will positively engage projecting portions 52 of lever members 49 even though portions 52 are disengaged from notches 41. It will further be observed that the portion 60 of the first pivoted plate members 33 below arcuate segment 38 provide another stop for limiting downward movement of wheels 18, portion 60 likewise engaging projecting portions 52 of lever members 49 even though they are disengaged from notches 41.

Inspection of FIG. 2 will now clearly reveal that the pivotal connections 40 and 44 of pivoted plate members 33 and 42 to bearing plates 22 and pivoted plate members 33 respectively, are disposed so that the downward force 57 exerted due to the weight of engine 13 and frame 11 is such that rear wheels 18 are forced into driving engagement with pinions 19, and in the preferred embodiment of my invention, the combined weights of the engine 13 and frame 11 constitute the sole force causing driving engagement of the rear wheels 18 of pinions 19.

In order to provide for selective disengagement of rear wheels 18 and pinions 19, I provide a guiding handle 58 having at its lower end a pair of transversely spaced apart arms 59. In the preferred embodiment of my invention, arms 59 are pivotally connected to frame 11 by studs 61 in recessed portions 25, as shown in FIGS. 5, 6 and 7. As best seen in FIG. 4, the lower sides of handle arms 59 at points spaced rearwardly from their pivotal connections 61 engage eccentric abutment members 62 secured to the uppermost and rearmost extremities of the first pivoted plate members 33 in any suitable manner, as by studs 63. It will now be readily seen that downward force in the direction of the arrow 64 exerted on handle 58 causes engagement of handle arms 59 with the eccentric abutment members 62 thus forcing the pivoted plate members 33 to pivot downwardly and rearwardly as shown by arrow 65 in turn causing disengagement of rear wheels 18 with the drive pinions 19. In the preferred embodiment of my invention, handle 58 is provided with sufficient weight so that it normally exerts sufficient downward force 64 to overcome the downward force 57 exerted by the weight of engine 13 and frame 11 thereby normally to cause disengagement of wheels 18 and pinion 19. Thus, when the mower 10 is left unattended, the mere weight of handle 58 will cause disengagement of the rear wheels 18 on the drive pinions 19. However, as soon as handle 58 is lifted upwardly off the eccentric abutments 62, downward force 64 is removed and thus downward force 57 exerted by the weight of engine 13 and frame 11 is exerted, causing the first pivoted plate members 33 to pivot in the opposite direction to produce engagement of rear wheels 18 and drive pinions 19. It is seen that the eccentric abutment 62 is eccentrically connected to pivoted plate members 33 by means of studs 63, and thus, the angle of inclination of handle 58 may be adjusted to suit the height and convenience of the operator of mower 10 by merely loosening studs 63 and rotating the eccentric abutment member 62 until the desired handle height is provided.

It is desirable to limit the pivotal motion of the pivoted plate members 33 and in order to accomplish this pivotal motion limitation, an arcuate slot 66 is formed in the bearing plates 22, arcuate slot 66 being centered on pivot 34 of first pivoted plate members 33. A shoulder 67 is provided positioned between bearing plate 22 and pivoted plate 33 having one portion 68 seated in the arcuate slot 66 and its other portion 69 seated in the pivot opening 71 in first pivoted plate members 33 for the second pivoted plate members 42. Inspection of FIG. 7 will reveal that the pivot studs 44 which support the second pivoted plate members 42 extend through and support shoulder bushing 67. It may be desirable positively to latch handle 58 in a position to cause disengagement of rear wheels 18 with the drive pinions 19 and for this purpose, latch members 72 are secured to the handle arms 59 and when engaged with shoulder 73 on bearing plates 22 maintain handle arms 59 in engagement with the eccentric abutments 62, as shown in FIG. 4.

Referring now to FIG. 8 in which like elements are indicated by like reference numerals, it may in certain instances be considered desirable pivotally to connect arms 59 of handle 58 to the first pivoted plate members 33 rather than to the frame 11 in such an arrangement as shown in FIG. 8.

It will now be readily seen that I have provided a simple mechanism for supporting the rear wheels of a rotary mower, this mechanism providing both a driving connection with the prime mover to effect self-propulsion of the mower over the ground, and selectively adjustable wheel height, thus eliminating the previous stated requirement for removing and reinserting wheel studs in order to determine the height of the mower.

While I have illustrated and described particular embodiments of my invention, further modifications and improvements will occur to those skilled in the art and I desire therefore in the appended claims to cover all modifications which do not depart from the spirit and scope of this invention.

What is claimed is:

1. In a self-propelled wheel-supported tool comprising: a frame having a prime mover mounted thereon for operating and propelling said tool, a pair of driving wheels, first plate members respectively located on each side of said frame and pivotally connected thereto, a power shaft rotatably supported on said frame and having drive elements thereon positioned for engagement respectively with said wheels responsive to downward movement of said frame relative thereto, means operatively connecting said power shaft to said prime mover, and handle means connected with said first plate members for controlling the pivotal movement thereof to move said wheels toward and away from said driving elements; the combination with said first plate members of second plate members respectively pivotally connected to said first plate members at points spaced from the pivotal axes of said first plate members, said wheels being respectively rotatably connected to said second plate members at points spaced from the pivotal axes of said second plate members, means for selectively latching each of said second plate members in a plurality of fixed positions with respect to its associated first plate member thereby to determine the height of said tool, each of said first plate members having an abutment stud eccentrically secured thereto, said handle means having two arms engageable respectively with said studs thereby selectively to determine the height of said handle means.

2. In a self-propelled wheel-supported tool comprising: a frame having a prime mover mounted thereon for operating and propelling said tool, a pair of driving wheels, first plate members respectively located on each side of said frame and pivotally connected thereto, a power shaft rotatably supported on said frame and having drive elements thereon positioned for engagement respectively with said wheels responsive to downward movement of said frame relative thereto, means operatively connecting said power shaft to said prime mover, and handle means connected with said first plate members for controlling the pivotal movement thereof to move said wheels toward and away from said driving elements; the combination with said first plate members of second plate members respectively pivotally connected to said first plate members at points spaced from the pivotal axes of said first plate members, said wheels being respectively rotatably connected to said second plate members at points spaced from the pivotal axes of said second plate members, each of said first plate members having forward and rear edges, each of said rear edges being formed as two arcuate segments connected by a step with the upper segment being rearmost and with a plurality of spaced apart notches being formed in the lower segment, and a lever member pivotally connected to each of said second plate members and having a portion selectively engageable with a notch in the respective first plate member, each of said steps forming an abutment for engaging the respective lever member portion thereby to limit downward movement of said frame with respect to said wheels.

References Cited in the file of this patent

UNITED STATES PATENTS

| | | |
|---|---|---|
| 2,167,785 | Taylor | Aug. 1, 1939 |
| 2,692,445 | Darnell | Oct. 26, 1954 |
| 2,818,699 | Clemson | Jan. 7, 1958 |
| 2,896,731 | Siwek | July 28, 1959 |
| 2,903,081 | Rudman | Sept. 8, 1959 |
| 2,915,318 | Chesser | Dec. 1, 1959 |